(12) United States Patent
Katayama et al.

(10) Patent No.: US 9,171,465 B2
(45) Date of Patent: Oct. 27, 2015

(54) WEATHER INFORMATION PROCESSING DEVICE AND WEATHER INFORMATION PROCESSING SYSTEM

(75) Inventors: Mutsumi Katayama, Saitama (JP); Tadafumi Nogawa, Tokyo (JP); Kentaro Ishii, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 656 days.

(21) Appl. No.: 13/576,027

(22) PCT Filed: Mar. 4, 2011

(86) PCT No.: PCT/JP2011/055036
§ 371 (c)(1),
(2), (4) Date: Jul. 30, 2012

(87) PCT Pub. No.: WO2011/122240
PCT Pub. Date: Oct. 6, 2011

(65) Prior Publication Data
US 2012/0310536 A1 Dec. 6, 2012

(30) Foreign Application Priority Data
Mar. 31, 2010 (JP) .................. 2010-083987

(51) Int. Cl.
*G01W 1/00* (2006.01)
*G06F 19/00* (2011.01)
(Continued)

(52) U.S. Cl.
CPC ...... *G08G 1/096716* (2013.01); *G01C 21/3461* (2013.01); *G01C 21/3691* (2013.01);
(Continued)

(58) Field of Classification Search
CPC ........... G01C 21/3461; G01C 21/3691; C01C 21/32; G01W 1/00; G01W 2001/006; G08G 1/096716; G08G 1/096741; G08G 1/096791; G09B 29/006; G09B 29/007; G09B 29/106
USPC ...................... 702/3, 150; 73/170.16; 340/905
See application file for complete search history.

(56) References Cited

U.S. PATENT DOCUMENTS

| 7,164,365 B2 * | 1/2007 | Doherty et al. ............... 340/905 |
| 7,475,594 B2 * | 1/2009 | Schultz ........................ 73/170.16 |
| 8,442,799 B2 * | 5/2013 | Yuhara et al. ................. 702/150 |
| 2004/0039517 A1 | 2/2004 | Biesinger et al. |

FOREIGN PATENT DOCUMENTS

| JP | 11-223674 | 8/1999 |
| JP | 2002-175592 | 6/2002 |

(Continued)

*Primary Examiner* — John H Le
(74) *Attorney, Agent, or Firm* — Rankin, Hill & Clark LLP

(57) ABSTRACT

Disclosed is a weather information processing device that can make the users of a mobile object aware of the changes in weather conditions in various environments. The weather information processing device is mounted in a vehicle and includes a first arithmetic processing element and a second arithmetic processing element. The first arithmetic processing element intermittently measures a weather condition variable indicating the weather conditions that a vehicle is in contact with, and if the current measurement value of the weather condition variable has a deviation of a predetermined value or greater from a reference value, generates a weather change detection information indicating the deviation. The second arithmetic processing element transmits the weather change detection information to another weather information processing device mounted in another vehicle to make it output a first weather information according to the weather change detection information.

16 Claims, 6 Drawing Sheets

(51) Int. Cl.
*G08G 1/0967* (2006.01)
*G01C 21/34* (2006.01)
*G09B 29/00* (2006.01)
*G09B 29/10* (2006.01)
*G01C 21/36* (2006.01)

(52) U.S. Cl.
CPC .......... *G01W 1/00* (2013.01); *G08G 1/096741* (2013.01); *G08G 1/096791* (2013.01); *G09B 29/006* (2013.01); *G09B 29/007* (2013.01); *G09B 29/106* (2013.01); *G01W 2001/006* (2013.01)

(56) References Cited

FOREIGN PATENT DOCUMENTS

| | | |
|---|---|---|
| JP | 2002-358599 | 12/2002 |
| JP | 2003-099888 | 4/2003 |
| JP | 2003-130963 | 5/2003 |
| JP | 2007-040912 | 2/2007 |
| JP | 2009-032181 | 2/2009 |
| JP | 2009-032194 | 2/2009 |
| WO | 2009/040977 | 4/2009 |

\* cited by examiner

WEATHER INFORMATION PROCESSING DEVICE AND WEATHER INFORMATION PROCESSING SYSTEM

TECHNICAL FIELD

The present invention relates to a weather information processing device mounted in a mobile object, and a weather information processing system composed of the mobile object mounted with the weather information processing device and a navigation server.

BACKGROUND ART

Hitherto, there has been known a weather detection system composed of a vehicle and a navigation server (for example, refer to Patent document 1).

In the weather detection system, a sensor for detecting probe information and weather data is disposed in the vehicle, and the detected probe information and the detected weather data are sent to the navigation server via a navigation device. In the navigation server, the weather conditions of an area where the vehicle is present are detected on the basis of the received probe information and the received weather data.

CITATION LIST

Patent Documents

Patent document 1: Japanese Patent Laid-open No. H11-223674

SUMMARY OF INVENTION

Technical Problem

However in recent years, along with the changes on the global environment, the occurrence frequency of local and abrupt weather changes represented by such a weather phenomenon as the so-called "guerrilla rainfall" (i.e., torrential rain) is rising. With respect to the occurrence of the local and abrupt weather change, the timing of updating the weather information by the navigation server may not catch up with the speed of the weather changes, or the setting of a time interval for the vehicle to access to the navigation server for obtaining the update information may not catch up with the speed of the weather changes. Therefore, it is considered that a user of a mobile object such as a vehicle or the like may have difficulty in comprehending the changes of the weather conditions in real time.

The present invention has been accomplished in view of the aforementioned problems, and it is therefore an object of the present invention to provide a weather information processing device that can improve the way that users of mobile objects are made aware of the changes in weather conditions in a variety of environments.

Solution to Problem

To attain an object described above, a first aspect of the present invention provides a weather information processing device mounted in a mobile object. The weather information processing device comprises: a first arithmetic processing element configured to intermittently measure a weather condition variable indicating the weather conditions that the mobile object is in contact with, and generate a weather change detection information indicating a deviation of a current measurement value of the weather condition variable from a reference value if the deviation is equal to or greater than a predefined value; and a second arithmetic processing element configured to transmit the weather change detection information to another weather information processing device mounted in another mobile object than the mobile object to make the another weather information processing device output a first weather information in accordance with the weather change detection information.

According to the weather information processing device of the first aspect of the present invention, if the deviation of the current measurement value of the weather condition variable indicating the weather conditions that the mobile object is in contact with from the reference value is equal to or greater than the predefined value, the weather change detection information indicating the deviation is generated. Thereafter, the weather change detection information is transmitted to another weather information processing device mounted in another mobile object located in a communication available range to the weather information processing device mounted in the mobile object. Accordingly, it is possible to make another weather information processing device mounted in another mobile object output the first weather information in accordance with the weather change detection information, and to make the user of another mobile object recognize the weather change.

In other words, when the weather conditions that the mobile object is in contact with change from the reference value to some extent, it is possible to make the user of another mobile object mounted with another weather information processing device located in a communication available range to the weather information processing device mounted in the mobile object recognize the changes in the weather conditions. Therefore, the user of another mobile object can take corresponding countermeasures in accordance with the changes in the weather conditions.

A second aspect of the weather information processing device is dependent on the weather information processing device of the first aspect of the present invention, wherein the first arithmetic processing element is configured to generate the weather change detection information by using at least one among a previous measurement value of the weather condition variable, a weather change previous measurement value indicating the previous measurement value at the timing where the deviation between the current measurement value and the previous measurement value is equal to or greater than the predetermined value, and the value of the weather condition variable indicated by a weather forecast information received from an external weather information source as the reference value.

According to the weather information processing device of the second aspect of the present invention, the weather change detection information indicating the deviation is generated if the deviation of the current measurement value of the weather condition variable from the previous measurement value becomes equal to or greater than the predetermined value, or if the deviation of the current measurement value from the weather change previous measurement value indicating the previous measurement value at the timing where the deviation is equal to or greater than the predetermined value becomes equal to or greater than the predetermined value, or if the deviation of the current measurement value from the value of the weather condition variable indicated by the weather forecast information received from an external weather information source becomes equal to or greater than the predetermined value.

In other words, when the weather conditions that the mobile object is in contact with deviate from the previous measurement value or the weather forecast information to some extent, it is possible to make the user of another mobile object mounted with another weather information processing device located in a communication available range to the weather information processing device mounted in the mobile object recognize the changes in the weather conditions. Moreover, since the measurement of the weather condition variable is performed intermittently, when the weather conditions that the mobile object is in contact with deviate from the weather change previous measurement value or the weather forecast information, the generation of the weather change detection information is continued; it is possible to make the user of another mobile object recognized that the changes in the weather conditions are in continuation. Therefore, the user of another mobile object can take corresponding countermeasures in accordance with the changes in the weather conditions.

A third aspect of the weather information processing device is dependent on the weather information processing device of the first aspect or the second aspect of the present invention, wherein the first arithmetic processing element is configured to generate the weather change detection information indicating one or a plurality of combinations of the deviation and at least one of a timing where the deviation is equal to or greater than the predetermined value and a position of the mobile object at the timing.

According to the weather information processing device of the third aspect of the present invention, the weather change detection information indicating one or a plurality of combinations of the deviation and at least one of a timing where the deviation is equal to or greater than the predetermined value and a position of the mobile object at the timing is transmitted to the weather information processing device mounted in another mobile object.

Accordingly, it is possible to make the user of another mobile object recognize the changes in the weather conditions and the timing or the position where the changes occurred. Thereby, the user of another mobile object can take corresponding countermeasures in accordance with the changes in the weather conditions and the timing or the position where the changes occurred.

To attain an object described above, a fourth aspect of the present invention provides an inter-vehicle weather information processing system provided with a first weather information processing device mounted in a first mobile object and a second weather information processing device mounted in a second mobile object. The first weather information processing device is configured to include a first arithmetic processing element configured to measure a current position of the first mobile object and a weather condition variable indicating the weather conditions that the first mobile object is in contact with, and generate a weather change detection information indicating one or a plurality of combinations of a deviation of a current measurement value of the weather condition variable from a reference value if the deviation is equal to or greater than a predetermined value and a position of the first mobile object at the timing where the deviation is equal to or greater than the predefined value; and a second arithmetic processing element configured to transmit the weather change detection information to the second weather information processing device. The second weather information processing device is configured to include a third arithmetic processing element configured to recognize a predicted travel trajectory of the second mobile object, perform an arithmetic processing to evaluate a relevance ratio between the predicted travel trajectory and the position of the first mobile object contained in the weather change detection information received from the first weather information processing device, and output a first weather information in accordance with the evaluation result of the relevance ratio.

According to the inter-vehicle weather information processing system of the fourth aspect of the present invention, if the deviation of the current measurement value of the weather condition variable indicating the weather conditions that the first mobile object is in contact with from the reference value is equal to or greater than the predetermined value, the weather change detection information indicating one or a plurality of combinations of the deviation and the position of the first mobile object at the timing where the deviation is equal to or greater than the predefined value is generated. Thereafter, the weather change detection information is transmitted to another weather information processing device mounted in the second mobile object located in a communication available range to the weather information processing device mounted in the first mobile object.

Thereby, the second mobile object recognizes the predicted travel trajectory of the second mobile object, evaluates the relevance ratio between the predicted travel trajectory and the position of the first mobile object contained in the weather change detection information received from the first weather information processing device, and outputs the first weather information in accordance with the evaluation result of the relevance ratio.

Accordingly, it is possible to make the user of the second mobile object recognize the relevance ratio between the predicted travel trajectory of the second mobile object and the position where the weather conditions changed. Therefore, the user of the second mobile object can take corresponding countermeasures in accordance with the relevance ratio.

In the inter-vehicle weather information processing system of the fourth aspect of the present invention, it is acceptable that the first arithmetic processing element is configured to generate the weather change detection information by using at least one among a previous measurement value of the weather condition variable, a weather change previous measurement value indicating the previous measurement value at the timing where the deviation between the current measurement value and the previous measurement value is equal to or greater than the predetermined value, and the value of the weather condition variable indicated by a weather forecast information received from an external weather information source as the reference value (Fifth aspect).

A sixth aspect of the inter-vehicle weather information processing system is dependent on the inter-vehicle weather information processing system of the fourth aspect of the present invention, wherein the third arithmetic processing element is configured to perform the arithmetic processing to evaluate the relevance ratio among the deviation, the predicted travel trajectory, and the position of the first mobile object contained in the weather change detection information at the timing where the deviation reaches the predetermined value.

According to the sixth aspect of the present invention, the second mobile object recognizes the predicted travel trajectory of the second mobile object, evaluates the relevance ratio between the predicted travel trajectory, the position of the first mobile object contained in the weather change detection information received from the first weather information processing device and the deviation, and outputs the first weather information in accordance with the evaluation result of the relevance ratio.

Accordingly, it is possible to make the user of the second mobile object recognize the relevance ratio between the predicted travel trajectory of the second mobile object, the position where the weather conditions changed and the change degree of the weather conditions. Therefore, the user of the second mobile object can take corresponding countermeasures in accordance with the relevance ratio.

To attain an object described above, a seventh aspect of the present invention provides a weather information processing system provided with a first weather information processing device mounted in a first mobile object, a second weather information processing device mounted in a second mobile object, and a server having a communication function between the first weather information processing device and the second weather information processing device. The first weather information processing device is configured to include a first arithmetic processing element configured to measure a current position of the first mobile object and a weather condition variable indicating the weather conditions that the first mobile object is in contact with, and generate a weather change detection information indicating one or a plurality of combinations of a deviation of a current measurement value of the weather condition variable from a reference value if the deviation is equal to or greater than a predetermined value and a position of the first mobile object at the timing where the deviation is equal to or greater than the predefined value; and a second arithmetic processing element configured to transmit the weather change detection information to the server. The server is configured to include a first support arithmetic processing element configured to generate a weather change area information indicating an area formed by meshes among a plurality of meshes supposed to have the weather conditions changed therein on the basis of a plurality of the weather change detection information collected from one or a plurality of the first weather information processing devices, and a second support arithmetic processing element configured to make the second weather information processing device output a second weather information in accordance with the weather change area information on the basis of communications with the second weather information processing device.

According to the weather information processing system of the seventh aspect of the present invention, if the deviation of the current measurement value of the weather condition variable indicating the weather conditions that the first mobile object is in contact with from the reference value is equal to or greater than the predetermined value, the weather change detection information indicating the deviation is generated and transmitted to the server.

In response, the server collects a plurality of the weather change detection information from one or a plurality of the first weather information processing devices, generates the weather change area information indicating an area supposed to have the weather conditions changed therein on the basis of a plurality of the weather change detection information, and transmits the weather change area information to the second weather information processing device.

Accordingly, it is possible to make the second weather information processing device output the second weather information in accordance with the weather change area information, and consequently make the user of the second mobile object recognize the area supposed to have the weather conditions changed therein. Therefore, the user of the second mobile object can take corresponding countermeasures in accordance with the area supposed to have the weather conditions changed therein.

In the weather information processing system of the seventh aspect of the present invention, it is acceptable that the first arithmetic processing element is configured to generate the weather change detection information by using a previous measurement value of the weather condition variable, a weather change previous measurement value indicating the previous measurement value at the timing where the deviation between the current measurement value and the previous measurement value is equal to or greater than the predetermined value, or the value of the weather condition variable indicated by a weather forecast information received from an external weather information source as the reference value (Eighth aspect).

In the weather information processing system of the seventh aspect of the present invention, it is acceptable that the first support arithmetic processing element is configured to generate the weather change area information indicating a weather change level of each mesh forming the area in addition to the area supposed to have the weather conditions changed therein on the basis of the deviation contained in the weather change detection information (Ninth aspect).

Accordingly, it is possible to add the weather change level of each mesh forming the area in addition to the area supposed to have the weather conditions changed therein to the weather change area, and consequently, it is possible to make the user of the second mobile object recognize the area supposed to have the weather conditions changed therein and the change degree of the weather conditions. Therefore, the user of the second mobile object can take corresponding countermeasures in accordance with the area supposed to have the weather conditions changed therein and the change degree of the weather conditions.

A tenth aspect of the weather information processing system is dependent on the weather information processing system of the seventh aspect of the present invention, wherein the second arithmetic processing element is configured to transmit the weather change detection information to the second weather information processing device, and the second weather information processing device is provided with a third arithmetic processing element configured to recognize the weather change area information or the second weather information on the basis of communications with the server if the weather change detection information is received from the first weather information processing device.

According to the weather information processing system of the tenth aspect of the present invention, in the second weather information processing device, when the weather change detection information is received from the first weather information processing device, the weather change area information or the second weather information is recognized on the basis of communications with the server. Accordingly, if the deviation of the weather conditions that the first mobile object is in contact with from the reference value is equal to or greater than the predetermined value, it is possible to make the user of the second mobile object mounted with the second weather information processing device located in a communication available range to the first weather information processing device mounted in the first mobile object recognize the information of the area supposed to have the weather conditions changed.

An eleventh aspect of the weather information processing system is dependent on the weather information processing system of the seventh aspect of the present invention, wherein the server is provided with a support map storage unit configured to store a support map information, the first support arithmetic processing element is configured to recognize a departure or present position and a target position of a user of the second mobile object mounted with the second weather information processing device on the basis of communications with the second weather information processing device, search a support route joining the departure or present position and the target position on the basis of the support map information, and perform a processing to evaluate a relevance ratio between the support route and the weather change area information; and the second support arithmetic processing element is configured to make the second weather information processing device output the second weather information in accordance with the evaluation result of the relevance ratio on the basis of communications with the second weather information processing device.

According to the weather information processing system of the eleventh aspect of the present invention, in the server, the support route joining the departure or present position and the target position of the second mobile object is searched, the relevance ratio between the support route and the weather change area information is evaluated, and the evaluation result of the relevance ratio is transmitted to the second weather information processing device. Accordingly, it is possible to make the second weather information processing device output the second weather information in accordance with the evaluation result of the relevance ratio; thereby, it is possible to make the user of the second mobile object recognize the geographical relevance ratio between the support route supposed to be passed through by the second mobile object and the area supposed to have the weather conditions changed therein. Thus, the user of the second mobile object can take corresponding countermeasures in accordance with the relevance ratio.

DESCRIPTION OF EMBODIMENTS

Configuration of a Weather Information Processing System According to a First Embodiment The configuration of the weather information processing system according to the first embodiment of the present invention will be described.

Figure 1:
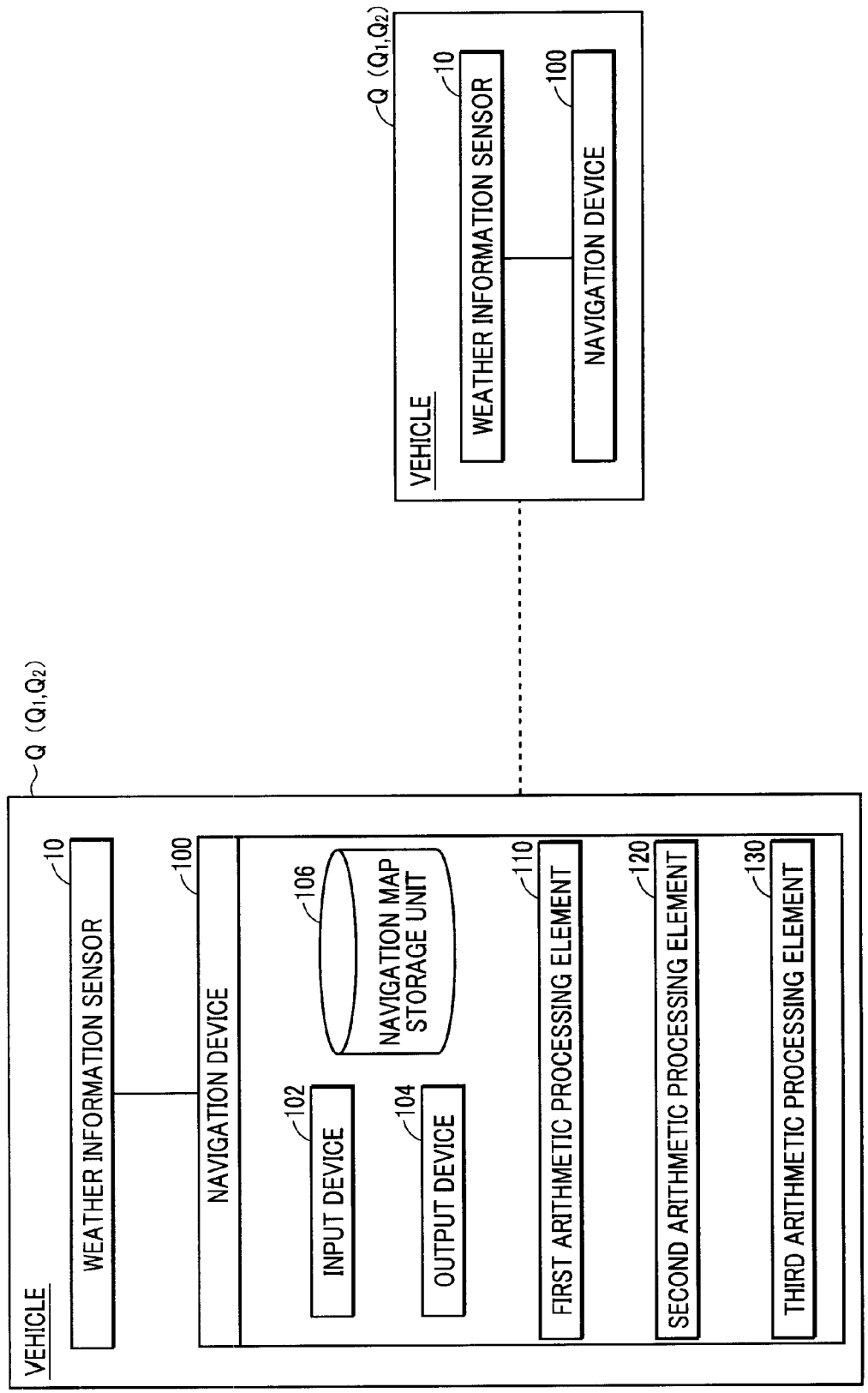
FIG. 1 is a structural block diagram of a weather information processing system according to a first embodiment of the present invention.

The weather information processing system illustrated in FIG. 1 includes navigation devices 100 functioning as both a weather information sensor 10 and a weather information processing device which are mounted in at least 2 vehicles Q. It is acceptable that the navigation device 100 is mounted in a two-wheeled automobile, a four-wheeled automobile, an electric cart, and the other transportation means, and it is also acceptable that a part of or the entire part of the navigation device 100 is constituted from a portable apparatus which may be detached from the vehicle Q.

In the vehicles Q, a particular vehicle subjected to the changes in weather conditions is defined as a first vehicle Q1, and another vehicle except the particular first vehicle Q1 (including another vehicle subject to the changes in the weather conditions) is defined as a second vehicle Q2. The vehicle Q may be equivalent to the first vehicle Q1 or the second vehicle Q2 according to situations.

In order to detect the rainfall with respect to the first vehicle Q1, as disclosed in Japanese Patent Laid-open No. S61-76946, the weather information sensor 10 is equipped with a raindrop sensor (not shown) configured to determine the falling of rain by detecting the changes in electrostatic capacity between a pair of electrodes caused by the water drops adhered to the both electrodes. In addition, as disclosed in Japanese Patent Laid-open No. 2009-85836, it is acceptable that the weather information sensor 10 is equipped with a sunlight sensor for determining a sunshine state by intersecting either one of a inspection light and a first reflection light from the front windshield with an extraneous light P so as to determine the change of transmittance. Moreover, the weather information sensor 10 may be any device configured to detect directly or indirectly the presence and the amount of rainfall, such as a thermometer, a hygrometer, a barometer, or an initiation switch for initiating a wiper (neither of them is illustrated in the drawings).

The navigation device 100 is provided with an input device 102, an output device 104, a navigation map storage unit 106, a first arithmetic processing element 110, a second arithmetic processing element 120, and a third arithmetic processing element 130.

The input device 102 includes a voice recognition device for recognizing a voice command from a user, a button or a dial operated by the user via fingers or hands, or the like of the vehicle Q. The output device 104 includes a display device disposed in a center console or the like, an audio device outputting vocal information to the user, or the like. The navigation map storage unit 106 is configured to store navigation map information to be output to the output device 104. The navigation map information contains link identification information for identifying each link.

The first arithmetic processing element 110 is configured to recognize a present position $P_{(t)}$ (or a departure position $P_1$) and a target position $P_2$ of the first vehicle Q1. Further, the first arithmetic processing element 110 is configured to determine the present position $P_{(t)}$ of the first vehicle Q1 at each timing, and store the present position $P_{(t)}$ together with the determination timing in a memory or a storage device. The present position $P_{(t)}$ of the first vehicle Q1 may be recognized by using GPS or may be recognized by using an acceleration sensor which outputs signals in accordance with the acceleration of the first vehicle Q1 if necessary. The position of the first vehicle Q1 is determined periodically (in each predetermined interval) or intermittently (every time when the first vehicle Q1 arrives at a prescribed position such as an end point or the like of a link).

The time-series position stored in the memory or the storage device, namely the combination of a timing and a position of the vehicle Q determined at the timing is transmitted as a probe information periodically or intermittently (for example, every time when the amount of data of the probe information reaches a predetermined value) to a navigation server (not shown).

Furthermore, the first arithmetic processing element 110 is configured to measure a weather condition variable $d_i$ indicating the weather conditions that the first vehicle Q1 is in contact with on the basis of the determination values from the weather information sensor 10, and generate a weather change detection information to be described hereinafter.

The second arithmetic processing element 120 is configured to transmit the weather change detection information including a weather change timing $T_i$ indicating the timing where a deviation to be described hereinafter is equal to or greater than a predetermined value and a weather change position $P_i$ indicating the present position of the first vehicle Q1 at the timing to the second vehicle Q2 to be output by the output device 104 of the second vehicle Q2.

The third arithmetic processing element 130 is configured to receive a variety of information such as the weather change detection information and the like transmitted from the first vehicle Q1, evaluate a relevance ratio between a navigation route r to be described hereinafter and the weather change position $P_i$ contained in the received weather change detection information, generate a first weather information in accordance with the evaluation result of the relevance ratio, and display the first weather information via the output device 104.

Each constituent element of the present invention may be made up of physically common hardware resources or physically separate hardware resources. For example, it is acceptable that all the arithmetic processing elements 110 to 130 share the same CPU; it is also acceptable that the first arithmetic processing element 110 and the second arithmetic processing element 120 includes a first CPU and the third arithmetic processing element 130 includes a second CPU separate from the first CPU.

That a constituent element of the present invention is configured to perform a relevant arithmetic computation process means that the constituent element is programmed to perform the relevant arithmetic computation process. Specifically, that the constituent element of the present invention is configured to perform a relevant arithmetic computation process means that an arithmetic processing device serving as the constituent element reads out a necessary program from memory and performs the arithmetic computation process according to the relevant program.

That a constituent element serving as a hardware recognizes information means that the constituent element performs a possible information processing on a piece of information to prepare it ready for other information processing, for example, the constituent element receives the piece of information; searches or retrieves the piece of information from a database or memory; calculates, estimates, configures, determines, searches the piece of information or the like via arithmetic processing on the basis of the received basic information or the like; visualizes information by decoding packages; and stores in memory or the like the calculated information or the like.

In addition, that a constituent element serving as a hardware outputs information means that the constituent element outputs the information in a possible form such as display, audio output, vibration output and the like of the information, which may be recognized by a human by means of five senses thereof such as eyesight, hearing, touch, etc.

(Functions of the Weather Information Processing System According to a First Embodiment)

The functions of the weather information processing system according to the first embodiment will be described.

Figure 2:
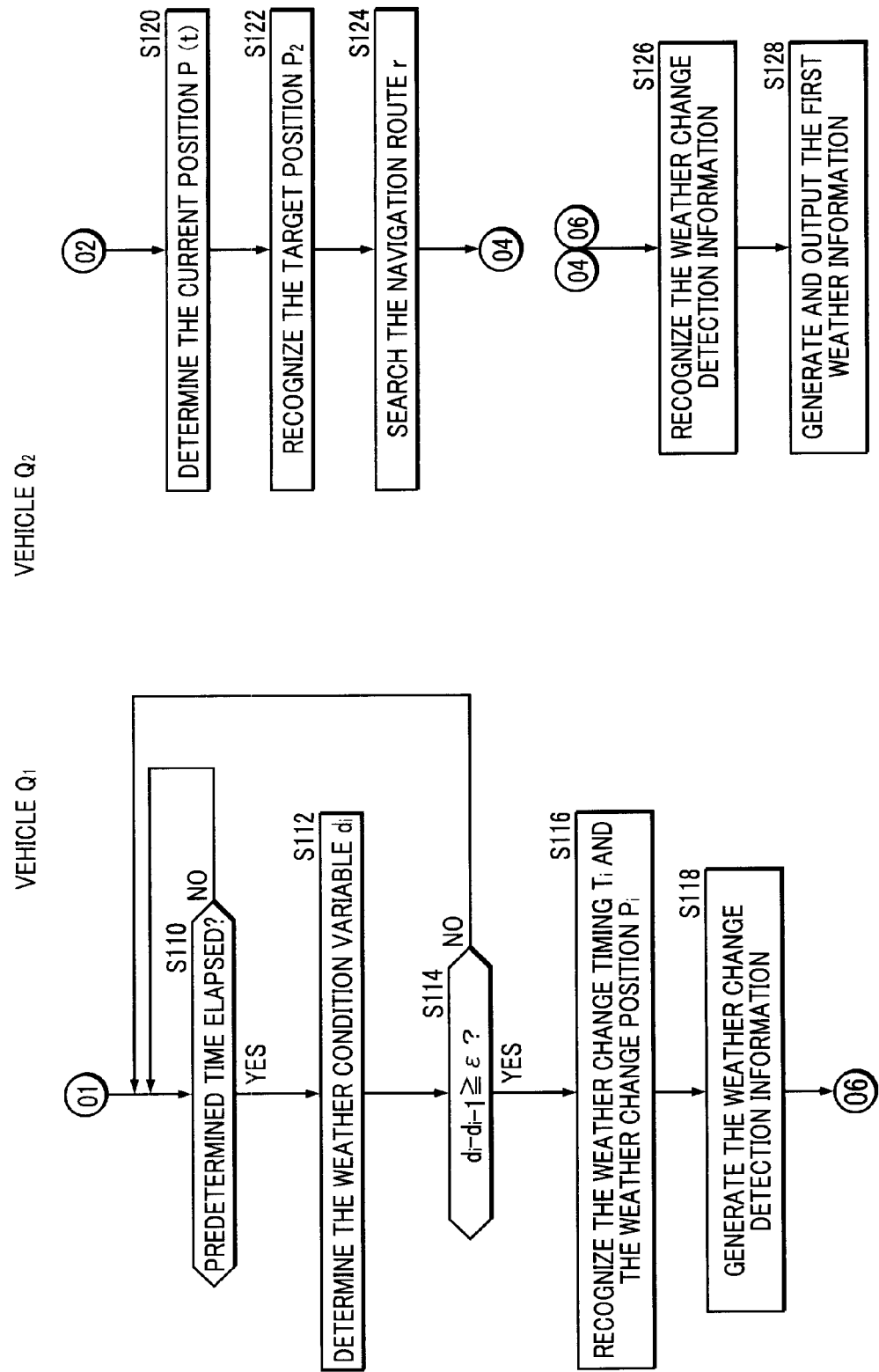
FIG. 2 is a functional block diagram of the weather information processing system according to a first embodiment of the present invention.

First, in the first vehicle Q1, the first arithmetic processing element 110, on condition that a predetermined time has elapsed (FIG. 2/STEP 110), measures the weather condition variable $d_i$ via the weather information sensor 10 (FIG. 2/STEP 112). Specifically, at least one among the amount of rainfall measured by the raindrop sensor, the atmospheric pressure measured by the barometer, the intensity of illumination of the sun on the vehicle measured by the sunlight sensor, the temperature outside the vehicle measured by the thermometer, the humidity measured by the hygrometer may be measured as the weather condition variable $d_i$. It is also acceptable to generate the weather condition variable $d_i$ according to a plurality of the measurement values mentioned above.

Thereafter, the first arithmetic processing element 110 determines whether or not the deviation of a currently measured $d_i$ from a previously measured $d_{i-1}$ is equal to or greater than a predetermined value $\epsilon$ (FIG. 2/STEP 114).

If the deviation is less than the predetermined value $\epsilon$ (FIG. 2/STEP 114 ·· NO), the weather condition variable $d_i$ is measured repeatedly.

If the deviation is equal to or greater than the predetermined value $\epsilon$ (FIG. 2/STEP 114 ·· YES), the first arithmetic processing element 110 recognizes the weather change timing $T_i$ indicating the timing where the weather change detection information is generated and the weather change position $P_i$ indicating the present position of the first vehicle Q1 where the weather condition variable $d_i$ is measured at the timing (FIG. 2/STEP 116). Then, the weather change detection information indicating one or a plurality of combinations of the deviation, the weather change position $P_i$ and the weather change timing $t_1$ is generated (FIG. 2/STEP 118).

Thereafter, in the first vehicle Q1, the second arithmetic processing element 120 transmits the weather change detection information to the second vehicle Q2.

Meanwhile, in the second vehicle Q2, the first arithmetic processing element 110 regularly measures the present position $P_{(t)}$ of the second vehicle Q2 on the basis of a GPS detection information received by a communication equipment or outputs from an acceleration sensor, a rate sensor and the like of the second vehicle Q2 (FIG. 2/STEP 120). Subsequently, the first arithmetic processing element 110 recognizes the target position $P_2$ of the second vehicle Q2 input by the user through the input device 102 (FIG. 2/STEP 122).

Thereafter, the first arithmetic processing element 110 searches a navigation route r on the basis of the navigation map information being stored in the navigation map storage unit 106, the present position $P_{(t)}$ and the target position $P_2$ of the second vehicle Q2 (FIG. 2/STEP 124).

In case that the weather change detection information is received from the first vehicle Q1, the navigation device 100 of the second vehicle Q2 performs the following processing.

Figure 3:
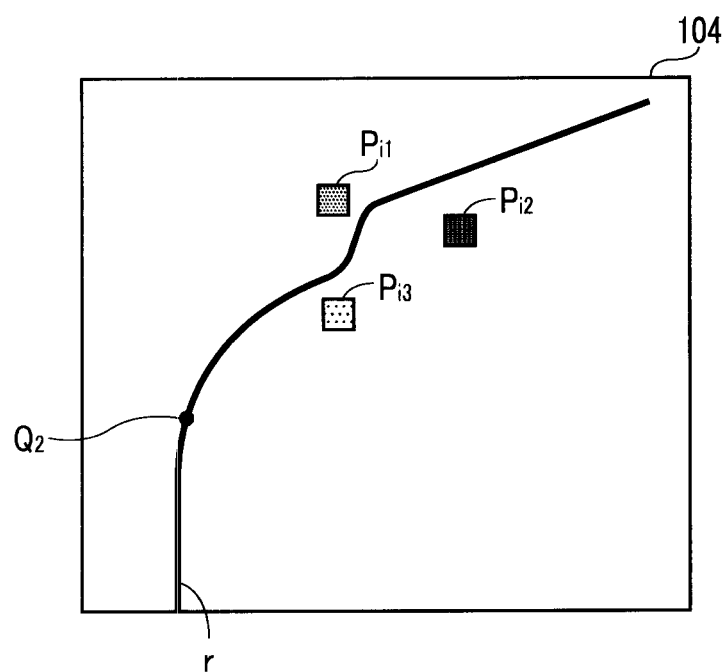
FIG. 3 is an explanatory diagram illustrating a screen output by an output device according to a first embodiment of the present invention.

First, in the second vehicle Q2, the third arithmetic processing element 130 recognizes the weather change detection information (FIG. 2/STEP 126). Thereafter, the third arithmetic processing element 130 evaluates the relevance ratio between the navigation route r and the weather change detection information, generates the first weather information in accordance with the evaluation result, and causes the output device 104 to output the first weather information as illustrated in FIG. 3 (FIG. 2/STEP 128).

Specifically, the relevance ratio between the navigation route r and the weather change detection information is evaluated according to the distance from the second vehicle Q2 and the navigation route r to the weather change position $P_i$ (for example, the minimum distance from the navigation route r to the weather change position $P_i$, or the minimum distance from the second vehicle Q2 to the weather change position $P_i$) and the deviation. In other words, the relevance ratio is evaluated higher as the distance from the navigation route r (or the second vehicle Q2) to the weather change position $P_i$ becomes shorter; on the contrary, the relevance ratio is evaluated lower as the distance from the navigation route r to the weather change position $P_i$ becomes longer. Further, as the deviation becomes greater, the change in the weather conditions is greater, and consequently the relevance ratio is evaluated higher; on the contrary, as the deviation becomes smaller, the change in the weather conditions is smaller, and consequently the relevance ratio is evaluated lower.

(Effects of the Weather Information Processing System According to the First Embodiment)

According to the weather information processing system of the first embodiment, in case that the current measurement value $d_i$ of the weather condition variable that the first vehicle Q1 is in contact with deviates from the previous measurement value $d_{i-1}$ by the predetermined value ϵ or more, the weather change detection information is generated on the basis of the deviation, the weather change timing $T_i$ and the weather change position $P_i$ and is transmitted to the navigation device 100 mounted in the second vehicle Q2 located in a communication available range to the navigation device 100 mounted in the first vehicle Q1.

Thereafter, the first weather information having the relevance ratio between the change in the weather conditions that the first vehicle Q1 is in contact with and the possible influence on the second vehicle Q2 is generated and displayed.

Therefore, according to the weather information processing system of the first embodiment, it is possible to make the user of the second vehicle Q2 recognize the changes in the weather conditions and the relevance ratio between the changes in the weather conditions and the self vehicle (the second vehicle Q2) so as to take corresponding countermeasures in accordance with the changes in the weather conditions.

(Variation of the Weather Information Processing System According to the First Embodiment)

In the first embodiment, it is acceptable that the weather information processing system evaluates the relevance ratio on the basis of a relative position relationship viewed from the self vehicle (the second vehicle Q2) with respect to the first vehicle Q1 from which the weather change detection information is transmitted, for example, the first vehicle Q1 is an oncoming vehicle (a vehicle travelling ahead of the second vehicle Q2 in the opposite direction to the travelling direction of the second vehicle Q2 along a travel route where the second vehicle Q2 is travelling) or a proceeding vehicle travelling in the same direction or the like without calculating the navigation route r. In other words, it is highly possible that the past travel trajectory of the oncoming first vehicle Q1 or the proceeding first vehicle Q1 travelling in the same direction at least partially overlaps with the travel trajectory supposed to be travelled by the self vehicle (the second vehicle Q2), thus the relevance ratio can be evaluated on the basis of the relative position relationship.

It is acceptable that the relevance ratio is evaluated higher in case that the first vehicle Q1 which has collected the weather change information from the first vehicle Q1 and transmitted the weather change information is the oncoming vehicle or the proceeding vehicle than in cases other than the case.

In addition, whether or not the first vehicle Q1 is an oncoming vehicle, a proceeding vehicle or a succeeding vehicle to the second vehicle Q2 may be determined on the basis of the time-series determination positions of the first vehicle Q1 which may be contained in the weather change detection information transmitted from the navigation device 100 mounted in the first vehicle Q1, the navigation map information stored in the navigation device 100 mounted in the second vehicle Q2 and the determination positions of the second vehicle Q2.

In the weather information processing system according to the first embodiment, it is acceptable that the current measurement value $d_i$ and the previous measurement value $d_{i-1}$ are transmitted as the weather change information as a substitute for the deviation.

In the weather information processing system according to the first embodiment, it is acceptable that a weather forecast information is received from an external weather information source, and whether or not the deviation between the value of the weather condition variable indicated by the weather forecast information and the current measurement value $d_i$ is equal to or greater than the predetermined value ϵ is determined.

Mostly, in a weather forecast system of a weather forecast company which delivers the external weather information, it is common that the weather observation is performed in an observation spot located in a mesh of 5 to 10 kilometers. Therefore, it is difficult to forecast local weather changes (for example, the so-called "guerrilla rainfall" (i.e., torrential rain) or the like) occurred in a range smaller than the mentioned mesh. In this regard, according to the weather information processing system of the first embodiment, since each vehicle Q serves as the observation spot, it is possible to detect the local weather changes impossible to be detected and forecasted by the above-mentioned weather forecast system, and consequently, it is possible to make the user of the second vehicle Q2 recognize the changes in the weather conditions and the relevance ratio between the changes in the weather conditions and the self vehicle (the second vehicle Q2) so as to take corresponding countermeasures in accordance with the changes in the weather conditions.

(Configuration of a Weather Information Processing System According to a Second Embodiment)

The configuration of the weather information processing system according to the second embodiment will be described.

Figure 4:
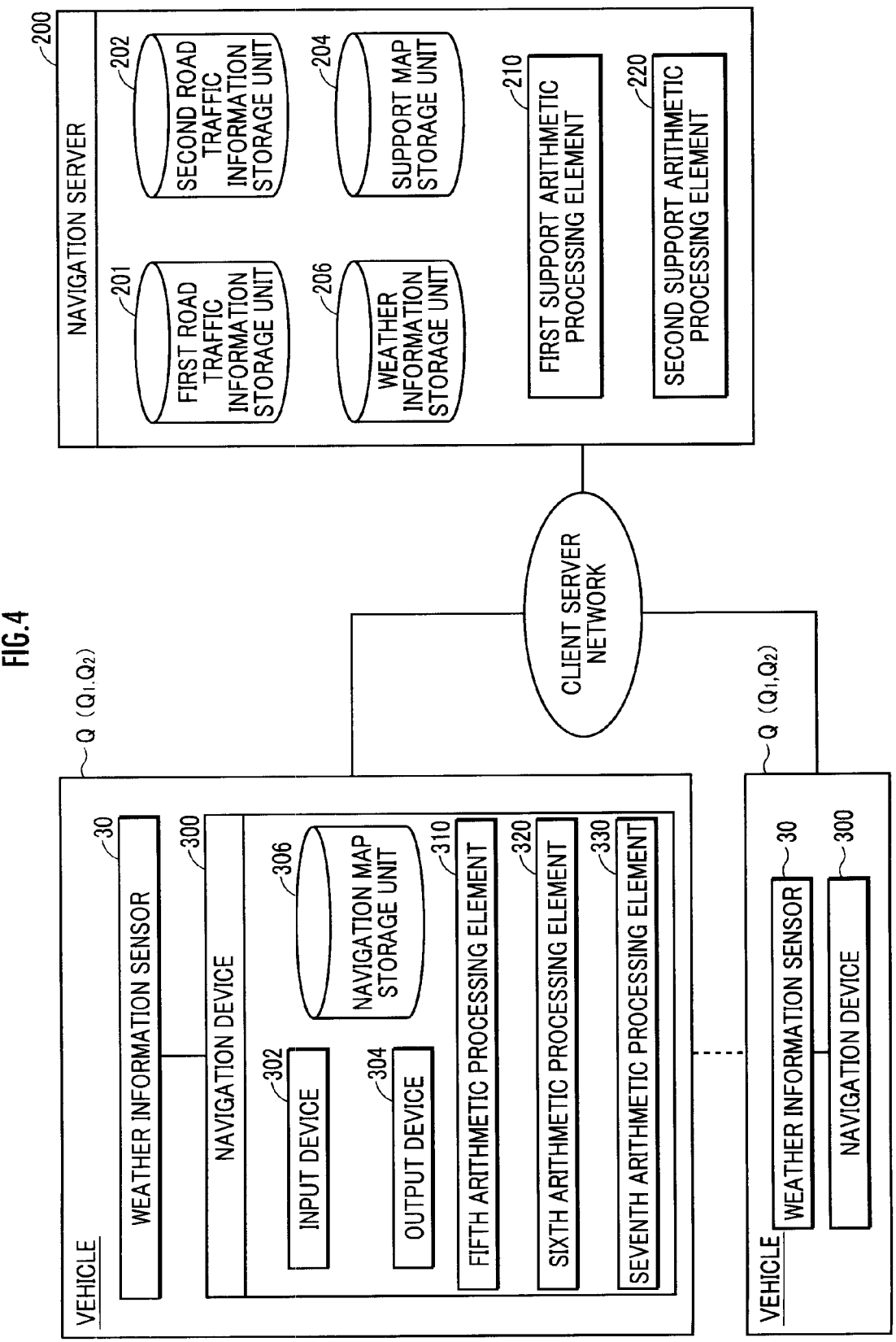
FIG. 4 is a structural block diagram of a weather information processing system according to a second embodiment of the present invention.

The weather information processing system illustrated in FIG. 4 includes a navigation server 200, and a navigation device 300 functioning as both a weather information sensor 30 and a weather information processing device which are mounted in a vehicle Q. It is acceptable that the navigation device 300 is mounted in a two-wheeled automobile, a four-wheeled automobile, an electric cart, and the other transportation means, and it is also acceptable that a part of or the entire part of the navigation device 300 is constituted from a portable apparatus which may be detached from the vehicle Q.

In the vehicles Q, a particular vehicle subjected to the changes in weather conditions is defined as a first vehicle Q1, and another vehicle except the particular first vehicle Q1 (including another vehicle subject to the changes in the weather conditions) is defined as a second vehicle Q2. The vehicle Q may be equivalent to the first vehicle Q1 or the second vehicle Q2 according to situations.

The navigation server 200 has a communication function to the navigation device 300 via a network joining client servers, and is composed of one or a plurality of server computers. As the communication network, an internet, a phone line network, a communication network using satellite broadcasting or the like may be adopted.

The navigation server 200 is provided with a first road traffic information storage unit 201, a second road traffic information storage unit 202, a support map storage unit 204, a weather information storage unit 206, a first support arithmetic processing element 210, and a second support arithmetic processing element 220.

The first road traffic information storage unit 201 is stored with a first road traffic information (a travel time required for each link, the presence of traffic jams or the like) based on a probe information (positions of each probe car at each timing) transmitted or uploaded to the navigation server 200 from the navigation device 300 mounted in the vehicle Q serving as a probe car or a floating car.

The second road traffic information storage unit 202 is stored with a second road traffic information (in addition to a travel time required for each link, the presence of traffic jams, an information indicating the presence of traffic regulations in each link, an information indicating the presence of events around each link, the types of the events and the like) transmitted to the navigation server 200 from a server of a road traffic information center or the like.

The support map storage unit 204 is stored with a support map information. In the support map information, the position, the shape and the posture and the like of each link constituting a road is represented by a sequence of coordinates ((latitude, longitude), or (latitude, longitude, altitude)). Moreover, each link is tagged with a link identification information for identifying each link and data indicating road type.

The weather information storage unit 206 is stored with a weather forecast information and a weather change detection information to be described hereinafter. The weather forecast information may be transmitted to the navigation server 200 via the network from a terminal device or the like (not shown) of a weather forecast company.

It is acceptable that a part of or the entire part of the storage units 201 to 206 composed of a memory or a storage device is configured as a database server separate from the navigation server 200.

The first support arithmetic processing element 210 recognizes a present position $P_{(t)}$ (or a departure position $P_1$) and a target position $P_2$ of the vehicle Q according to communications with the navigation device 300. The first support arithmetic processing element 210 is configured to search a support route R joining the present position $P_{(t)}$ and the target position $P_2$ for the vehicle Q on the basis of the support map information stored in the support map storage unit 204.

Further, the first support arithmetic processing element 210 recognizes the weather change detection information to be described hereinafter according to communications with the navigation device 300, and recognizes an weather change area information indicating a weather change area S which is an area constituted from meshes supposed to have the changes occurred in the weather conditions and a weather change level or the like of each weather change mesh which is a mesh constituting the weather change area S on the basis of the recognized information.

Furthermore, the first support arithmetic processing element 210 evaluates the relevance ratio of the weather change area information with respect to the support route R.

The second support arithmetic processing element 220 delivers the weather forecast information stored in the weather information storage unit 206 according to communications with the navigation device 300. The second support arithmetic processing element 220 is configured to cause the navigation device 300 to recognize and display a variety of information such as a support route R, the weather change area information, and the relevance ratio.

In order to detect the rainfall with respect to the first vehicle Q1, as disclosed in Japanese Patent Laid-open No. S61-76946, the weather information sensor 30 is equipped with a raindrop sensor (not shown) configured to determine the falling of rain by detecting the changes in electrostatic capacity between a pair of electrodes caused by the water drops adhered to the both electrodes. In addition, it is acceptable that the weather information sensor 30 is any device configured to detect directly or indirectly the presence and the amount of rainfall, such as a sunlight sensor for determining a sunshine state, a hygrometer, or an initiation switch for initiating a wiper (neither of them is illustrated in the drawings).

The navigation device 300 is provided with an input device 302, an output device 304, a navigation map storage unit 306, a fifth arithmetic processing element 310, a sixth arithmetic processing element 320, and a seventh arithmetic processing element 330.

The input device 302 includes a voice recognition device recognizing a voice command from a user, a button or a dial operated by the user via fingers or hands, or the like. The output device 304 includes a display device disposed in a center console or the like of the vehicle Q, an audio device outputting vocal information to the user, or the like. The navigation map storage unit 306 is configured to store navigation map information to be output to the output device 304. The navigation map information contains link identification information for identifying each link.

The fifth arithmetic processing element 310 is configured to recognize a variety of information such as the weather forecast information and the like according to communications with the navigation server 200.

The fifth arithmetic processing element 310 is configured to recognize the present position $P_{(t)}$ (or the departure position $P_1$) and the target position $P_2$ of the vehicle Q. Further, the fifth arithmetic processing element 310 is configured to determine the present position $P_{(t)}$ of the vehicle Q at each timing, and store the present position $P_{(t)}$ together with the determination timing in a memory or a storage device. The present position $P_{(t)}$ of the vehicle Q may be recognized by using GPS or may be recognized by using an acceleration sensor which outputs signals in accordance with the acceleration of the vehicle Q if necessary. The position of the vehicle Q is determined periodically (in each predetermined interval) or intermittently (every time when the vehicle Q arrives at a prescribed position such as an end point or the like of a link).

The time-series position stored in the memory or the storage device, namely the combination of a timing and a position of the vehicle Q determined at the timing is transmitted as a probe information periodically or intermittently (for example, every time when the amount of data of the probe information reaches a predetermined value) to a navigation server (not shown).

Furthermore, the fifth arithmetic processing element 310 is configured to measure a weather condition variable $d_i$ indicating the weather conditions that the vehicle Q is in contact with on the basis of the determination values from the weather information sensor 30, and generate a weather change detection information to be described hereinafter.

The sixth arithmetic processing element 320 is configured to cause the navigation server 200 and the navigation device 300 of another vehicle Q to recognize a variety of information such as the weather change detection information to be described hereinafter on the basis of communications with the navigation server 200 and the navigation device 300 mounted in a second vehicle Q2.

The seventh arithmetic processing element 330 is configured to receive a variety of information such as the weather change detection information to be described hereinafter and a second weather information and the like on the basis of communications with the navigation server 200 and the navigation device 300, and display them on the output device 304. Further, the seventh arithmetic processing element 330 is configured to transmit a confirmation command to be described hereinafter to the navigation server 200 when receiving the weather change detection information.

That a constituent element serving as a hardware recognizes information means that the constituent element performs a possible information processing on a piece of information to prepare it ready for other information processing, for example, the constituent element receives the piece of information; searches the piece of information in a database or memory or retrieves the piece of information from a database or memory; calculates, estimates, configures, determines, searches the piece of information or the like via arithmetic processing on the basis of the received basic information or the like; visualizes information by decoding packets; and stores in memory or the like the calculated information or the like.

In addition, that a constituent element serving as a hardware outputs information means that the constituent element outputs the information in a possible form such as display, audio output, vibration output and the like of the information, which may be recognized by a human by means of five senses thereof such as eyesight, hearing, touch, etc.

(Functions of the Weather Information Processing System According to a Second Embodiment)

The functions of the weather information processing system according to the second embodiment will be described.

Figure 5:
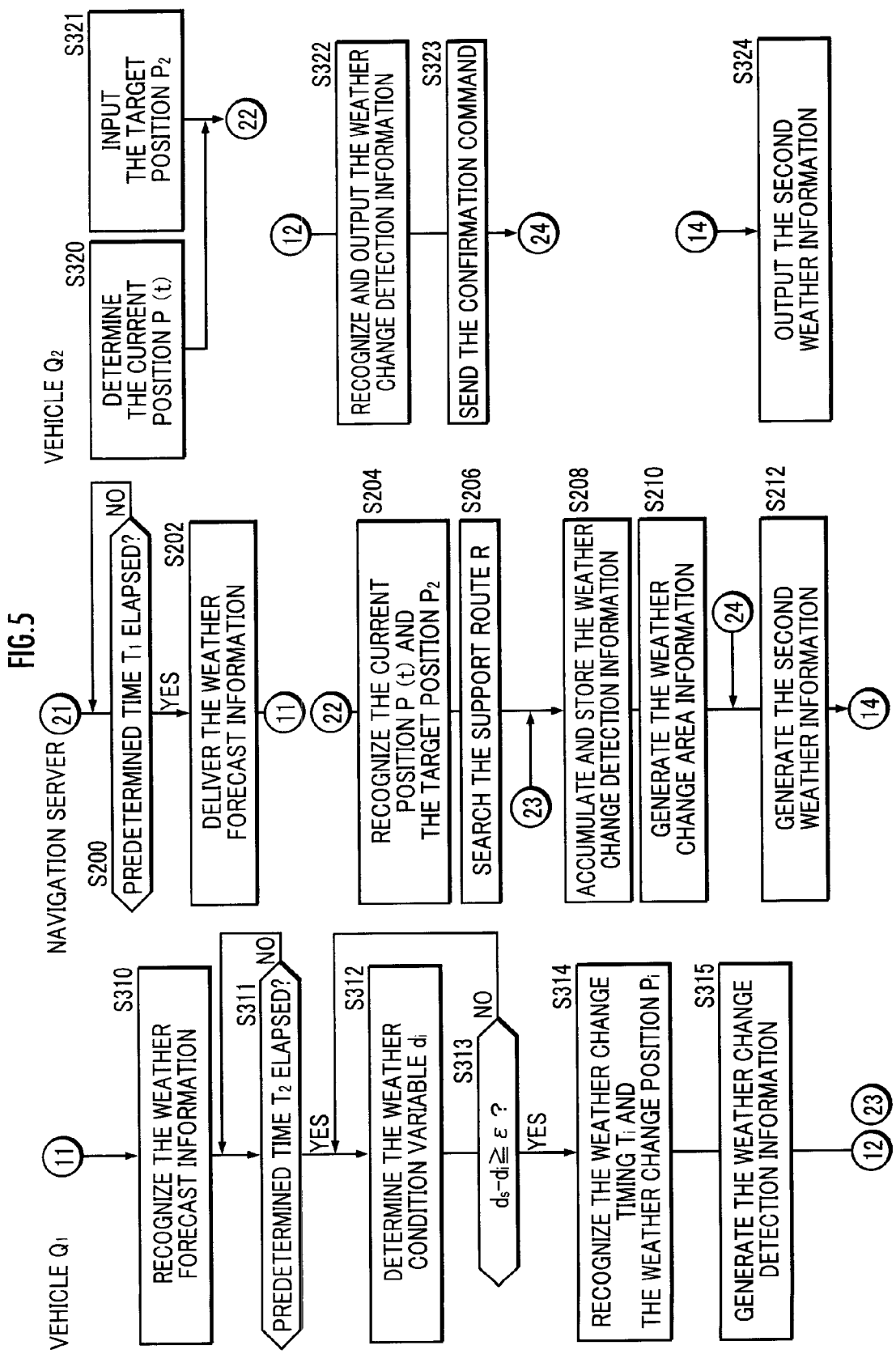
FIG. 5 is a functional block diagram of the weather information processing system according to a second embodiment of the present invention.

In the navigation server 200, the first support arithmetic processing element 210 delivers the newest weather forecast information among the weather forecast information stored in the weather information storage unit to a first vehicle Q1 (FIG. 5/STEP 202) on condition that a first predetermined time interval T1 has elapsed (FIG. 5/STEP 200).

In the first vehicle Q1, the fifth arithmetic processing element 310 recognizes the weather forecast information (FIG. 5/STEP 310). Thereafter, the fifth arithmetic processing element 310 measures the weather condition variable $d_i$ via the weather information sensor 30 (FIG. 5/STEP 312) on condition that a second predetermined time interval T2 has elapsed (FIG. 5/STEP 311). The first predetermined time interval T1 and the second predetermined time interval T2 are set in such a way that T2 is a time interval shorter than T1.

Then, the fifth arithmetic processing element 310 determines the value of the weather condition variable indicated by the weather forecast information delivered from the navigation server 200 as a value of a new standard weather condition variable $d_s$. Subsequently, whether or not the deviation of a currently measured weather condition variable $d_i$ from the standard weather condition variable $d_s$ is equal to or greater than a predetermined value $\epsilon$ is determined (FIG. 5/STEP 313). Specifically, at least one among the amount of rainfall measured by the raindrop sensor, the atmospheric pressure measured by the barometer, the intensity of illumination of the sun on the vehicle measured by the sunlight sensor, the temperature outside the vehicle measured by the thermometer, the humidity measured by the hygrometer may be measured as the weather condition variable $d_i$. It is also acceptable to generate the weather condition variable $d_i$ according to a plurality of the measurement values mentioned above.

If the deviation is less than the predetermined value $\epsilon$ (FIG. 5/STEP 313 •• NO), the weather condition variable $d_i$ is measured repeatedly while the weather forecast information is being updated according to the delivered information from the navigation server 200.

If the deviation is equal to or greater than the predetermined value $\epsilon$ (FIG. 5/STEP 313 •• YES), the fifth arithmetic processing element 310 recognizes the weather change timing $T_i$ indicating the timing where the weather change detection information is generated and the weather change position $P_i$ indicating the measurement position of the first vehicle Q1 where the weather condition variable $d_i$ is measured at the timing (FIG. 5/STEP 314). Then, the fifth arithmetic processing element 310 generates the weather change detection information indicating one or a plurality of combinations of the deviation, the weather change position $P_i$ and the weather change timing $T_1$ (FIG. 5/STEP 315). Thereafter, the sixth arithmetic processing element 320 transmits the weather change detection information to the navigation server 200 and the second vehicle Q2. The generation and the transmission of the weather change detection information are performed intermittently and repeatedly until the deviation becomes smaller than the predetermined value $\epsilon$.

The navigation device 300 of the second vehicle Q2 performs the following processing.

Firstly, in the second vehicle Q2, the fifth arithmetic processing element 310 regularly measures the present position $P_{(t)}$ of the second vehicle Q2 on the basis of a GPS detection information received by a communication equipment or outputs from an acceleration sensor, a rate sensor and the like of the second vehicle Q2 (FIG. 5/STEP 320). Subsequently, the fifth arithmetic processing element 310 recognizes the target position $P_2$ of the second vehicle Q2 input by the user through the input device 302 (FIG. 5/STEP 321). Thereafter, the sixth arithmetic processing element 320 transmits the present position $P_{(t)}$ and the target position $P_2$ to the navigation server 200.

In the second vehicle Q2, the seventh arithmetic processing element 330 recognizes the weather change detection information transmitted from the first vehicle Q1 and outputs the weather change detection information to the output device 304 (FIG. 5/STEP 322).

Subsequently in the second vehicle Q2, the seventh arithmetic processing element 330 transmits the confirmation command for confirming the relevance ratio of the changes in the weather conditions indicated by the weather change detection information with respect to the second vehicle Q2 to the navigation server 200 (FIG. 5/STEP 323).

Meanwhile, in the navigation server 200, the first support arithmetic processing element 210 recognizes the present position $P_{(t)}$ and the target position $P_2$ according to the present position $P_{(t)}$ and the target position $P_2$ of the user transmitted from the second vehicle Q2 (FIG. 5/STEP 204). Thereafter, the first support arithmetic processing element 210 searches a support route R joining the present position $P_{(t)}$ and the target position $P_2$ on the basis of the support map information stored in the support map storage unit 204, the first road traffic information stored in the first road traffic information storage unit 201, and the second road traffic information stored in the second road traffic information storage unit 202 (FIG. 5/STEP 206).

According to the weather change detection information transmitted from the first vehicle Q1, the first support arithmetic processing element 210 of the navigation server 200 accumulates or stores the weather change detection information in the weather information storage unit 206 (FIG. 5/STEP 208). The accumulated weather change detection information is not limited to the weather change detection information transmitted from a specific first vehicle Q1 which has transmitted the weather change detection information to the second vehicle Q2, it may be the weather change detection information transmitted from a plurality of the first vehicles Q1 subjected to the changes in the weather conditions.

The first support arithmetic processing element 210 generates the weather change area information on the basis of a plurality of the weather change detection information accumulated in the weather information storage unit 206 (FIG. 5/STEP 210). Specifically, the first support arithmetic processing element 210 recognizes an weather change area information indicating the contents of the changes in the weather conditions, the weather change area S which is an area constituted from meshes supposed to have the changes occurred in the weather conditions, and the weather change level or the like of each weather change mesh which is a mesh constituting the weather change area S on the basis of the weather change detection information for each link. It is preferable that the weather change area information is updated by weighting the newest weather change detection information transmitted from the first vehicle Q1.

According to the confirmation command transmitted from the second vehicle Q2, the first support arithmetic processing element 210 of the navigation server 200 generates the second weather information in which the relevance ratio of the weather change area with respect to the support route R has been evaluated (FIG. 5/STEP 212). Specifically, the relevance ratio of the weather change area information with respect to the support route R may be evaluated according to whether or not a route in the support route R where the second vehicle Q2 is about to travel passes through or passes nearby the weather change area S; and furthermore, if the route in the support route R where the second vehicle Q2 is about to travel passes through the weather change area S, the relevance ratio of the weather change area information with respect to the support route R may be evaluated according to whether or not the level of the changes in the weather conditions in the meshes constituting the weather change area S is high.

In other words, if the support route R passes through a weather change mesh having a higher weather change level, the relevance ratio is evaluated higher; as the support route R deviates further from a weather change mesh having a higher weather change level, the relevance ratio is evaluated lower.

Thereafter, the second support arithmetic processing element 220 transmits the second weather information to the second vehicle Q2.

Figure 6:
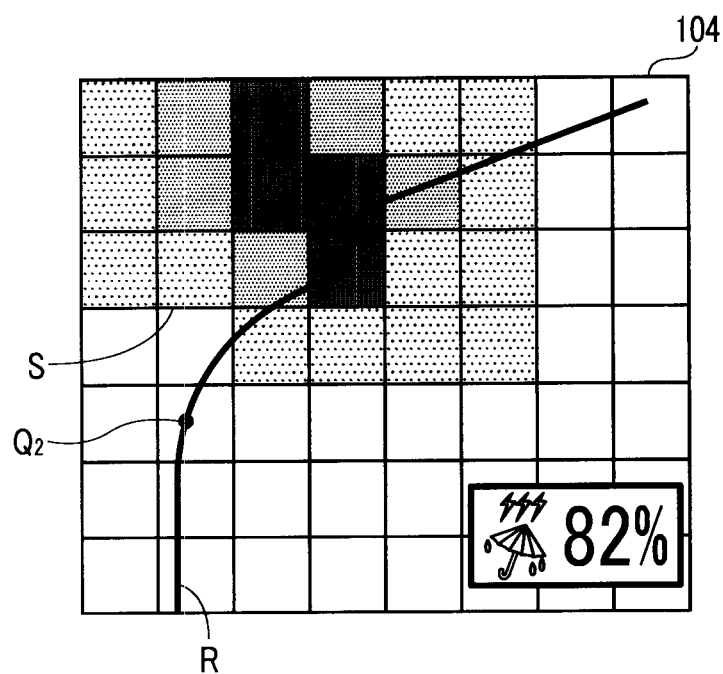
FIG. 6 is an explanatory diagram illustrating a screen output by an output device according to a second embodiment of the present invention.

According to the second weather information transmitted from the navigation server, the seventh arithmetic processing element 330 of the second vehicle Q2 recognizes the second weather information, and makes the output device 304 to output the second weather information as illustrated in FIG. 6 (FIG. 5/STEP 324).

(Effects of the Weather Information Processing System According to the Second Embodiment)

According to the weather information processing system of the second embodiment, the weather forecast information is transmitted from the navigation server at the first predetermined time interval T1, and the value of the weather condition variable indicated by the weather forecast information is determined as the value of the standard weather condition variable $d_s$. Thereafter, the measurement value $d_i$ of the weather condition variable indicating the weather conditions that the first vehicle Q1 is in contact with is measured at the second predetermined time interval T2. The second predetermined time interval T2 is shorter than the first predetermined time interval T1 indicating a time interval where the navigation server 200 delivers the weather forecast information.

If the deviation of the currently measured weather condition variable $d_i$ from the standard weather condition variable $d_s$ is equal to or greater than the predetermined value $\epsilon$, the weather change detection information indicating one or a plurality of combinations of the deviation and the probe information at the timing when the deviation is equal to or greater than the predetermined value is generated.

Then, the weather change detection information is transmitted to the second vehicle Q2 located in a communication available range to the navigation device 300 of the first vehicle Q1. According thereto, in the second vehicle Q2, the weather change detection information can be made to output from the output device 304; thereby, the user of the second vehicle Q2 can recognize that the weather conditions are changing in the communication available range.

In order to confirm the relevance ratio of the weather change detection information received from the first vehicle Q1 with respect to the support route R of the second vehicle Q2, the navigation device 300 of the second vehicle Q2 transmits the confirmation command to the navigation server 200.

Meanwhile, in the navigation server, the support route R joining the present position $P_{(t)}$ and the target position $P_2$ of the second vehicle Q2 is searched. Moreover, in the navigation server, the weather change detection information transmitted from one or a plurality of the first vehicles Q1 is accumulated or stored; and on the basis of the accumulated weather change detection information, the weather change area information of an area supposed to have the weather condition changed is generated.

According to the recognition of the confirmation command transmitted from the second vehicle Q2, in the navigation server 200, the second weather information in which the relevance ratio of the weather change area information with respect to the support route R of the second vehicle Q2 has been evaluated is generated. Therefore, the navigation server 200 can make the navigation device 300 of the second vehicle Q2 output the second weather information; thereby, the user of the second vehicle Q2 can recognize the mentioned information.

In other words, it is possible to make the user of the second vehicle Q2 recognize the relevance ratio of the changes in the weather conditions with respect to the support route R supposed to be passed through.

Additionally, in the second vehicle Q2, the weather information sensor 30 measures the changes in the weather conditions at a time interval which is the second predetermined time interval T2, and the second predetermined time interval T2 is shorter than the first predetermined time interval T1 which indicates a time interval in which the navigation server 200 distributes the weather forecast information. Thus, according to the weather information processing system of the second embodiment, even if the weather conditions change abruptly, it is possible to make the user of the second vehicle Q2 aware of the changes in the weather conditions, earlier than the delivery of the weather forecast from the navigation server 200, so as to take corresponding countermeasures in accordance with the changes in the weather conditions.

Particularly, in a weather forecast system of a weather forecast company which delivers the external weather information, it is common to deliver the weather forecast information at intervals of 10 to 15 minutes. Thus, if the changes in the local weather conditions occur in an extremely short period (for example, the so-called "guerrilla rainfall" (i.e., torrential rain) or the like), it is difficult to deliver the weather forecast information so as to afford the user enough time to take the corresponding countermeasures. In this regard, according to the weather information processing system of the second embodiment, at the timing where the first vehicle Q1 detects the changes in the weather conditions, it is possible to make the second vehicle Q2 located in the communication available range recognize the presence of the changes in the weather conditions so as to take the corresponding countermeasures.

(Variation of the Weather Information Processing System According to the Second Embodiment)

In the weather information processing system according to the second embodiment, the second weather information is generated in the navigation server 200; however, the present invention is not limited thereto, it is possible to transmit the relevance ratio from the navigation server 200 to the vehicle 2 and generate the second weather information in the side of vehicle 2.

In the weather information processing system according to the second embodiment, it is acceptable to make the first vehicle Q1 recognize the second weather information.

In the weather information processing system according to the second embodiment, the deviation is generated by using the value of the standard weather condition variable $d_s$ indicated by the weather forecast information delivered from the navigation server 200; however, it is acceptable to generate the deviation of the currently measured $d_i$ from the previously measured $d_{i-1}$.

The invention claimed is:

1. A weather information processing device mounted in a mobile object, comprising:
   a first arithmetic processing element configured to intermittently measure a weather condition variable indicating the weather conditions that the mobile object is in contact with, and generate a weather change detection information indicating a deviation of a current measurement value of the weather condition variable from a reference value if the deviation is equal to or greater than a predefined value; and
   a second arithmetic processing element configured to transmit the weather change detection information to another weather information processing device mounted in another mobile object than the mobile object to make the another weather information processing device output a first weather information in accordance with the weather change detection information.

2. The weather information processing device according to claim 1, wherein
   the first arithmetic processing element is configured to generate the weather change detection information by using at least one among a previous measurement value of the weather condition variable, a weather change previous measurement value indicating the previous measurement value at the timing where the deviation between the current measurement value and the previous measurement value is equal to or greater than the predefined value, and the value of the weather condition variable indicated by a weather forecast information received from an external weather information source as the reference value.

3. The weather information processing device according to claim 2, wherein
   the first arithmetic processing element is configured to generate the weather change detection information indicating one or a plurality of combinations of the deviation and at least one of a timing where the deviation is equal to or greater than the predefined value and a position of the mobile object at the timing.

4. The weather information processing device according to claim 1, wherein
   the first arithmetic processing element is configured to generate the weather change detection information indicating one or a plurality of combinations of the deviation and at least one of a timing where the deviation is equal to or greater than the predefined value and a position of the mobile object at the timing.

5. The weather information processing device according to claim 1, wherein the first arithmetic processing element is configured to generate the weather change detection information by using at least one of a previous measurement value of the weather condition variable and a weather change previous measurement value indicating the previous measurement value at a timing where a deviation between the current measurement value and the previous measurement value is equal to or greater than the predefined value as the reference value.

6. An inter-vehicle weather information processing system provided with a first weather information processing device mounted in a first mobile object and a second weather information processing device mounted in a second mobile object,
   the first weather information processing device being configured to include
   a first arithmetic processing element configured to measure a current position of the first mobile object and a weather condition variable indicating the weather conditions that the first mobile object is in contact with, and generate a weather change detection information indicating one or a plurality of combinations of a deviation of a current measurement value of the weather condition variable from a reference value if the deviation is equal to or greater than a predefined value and a position of the first mobile object at the timing where the deviation is equal to or greater than the predefined value; and
   a second arithmetic processing element configured to transmit the weather change detection information to the second weather information processing device,
   the second weather information processing device being configured to include
   a third arithmetic processing element configured to recognize a predicted travel trajectory of the second mobile object, perform an arithmetic processing to evaluate a relevance ratio between the predicted travel trajectory and the position of the first mobile object contained in the weather change detection information received from the first weather information processing device, and output a first weather information in accordance with the evaluation result of the relevance ratio.

7. The inter-vehicle weather information processing system according to claim 6, wherein
   the first arithmetic processing element is configured to generate the weather change detection information by using at least one among a previous measurement value of the weather condition variable, a weather change previous measurement value indicating the previous measurement value at the timing where the deviation between the current measurement value and the previous measurement value is equal to or greater than the predefined value, and the value of the weather condition variable indicated by a weather forecast information received from an external weather information source as the reference value.

8. The inter-vehicle weather information processing system according to claim 7, wherein
   the third arithmetic processing element is configured to perform the arithmetic processing to evaluate the relevance ratio among the deviation, the predicted travel trajectory, and the position of the first mobile object contained in the weather change detection information at the timing where the deviation reaches the predefined value.

9. The inter-vehicle weather information processing system according to claim 6, wherein
the third arithmetic processing element is configured to perform the arithmetic processing to evaluate the relevance ratio among the deviation, the predicted travel trajectory, and the position of the first mobile object contained in the weather change detection information at the timing where the deviation reaches the predefined value.

10. A weather information processing system provided with a first weather information processing device mounted in a first mobile object, a second weather information processing device mounted in a second mobile object, and a server having a communication function between the first weather information processing device and the second weather information processing device,
the first weather information processing device being configured to include
a first arithmetic processing element configured to measure a current position of the first mobile object and a weather condition variable indicating the weather conditions that the first mobile object is in contact with, and generate a weather change detection information indicating one or a plurality of combinations of a deviation of a current measurement value of the weather condition variable from a reference value if the deviation is equal to or greater than a predefined value and a position of the first mobile object at the timing where the deviation is equal to or greater than the predefined value; and
a second arithmetic processing element configured to transmit the weather change detection information to the server,
the server being configured to include
a first support arithmetic processing element configured to generate a weather change area information indicating an area formed by meshes among a plurality of meshes supposed to have the weather conditions changed therein on the basis of a plurality of the weather change detection information collected from one or a plurality of the first weather information processing devices, and
a second support arithmetic processing element configured to make the second weather information processing device output a second weather information in accordance with the weather change area information on the basis of communications with the second weather information processing device.

11. The weather information processing system according to claim 10, wherein
the first arithmetic processing element is configured to generate the weather change detection information by using a previous measurement value of the weather condition variable, a weather change previous measurement value indicating the previous measurement value at the timing where the deviation between the current measurement value and the previous measurement value is equal to or greater than the predefined value, or the value of the weather condition variable indicated by a weather forecast information received from an external weather information source as the reference value.

12. The weather information processing system according to claim 11, wherein
the first support arithmetic processing element is configured to generate the weather change area information indicating a weather change level of each mesh forming the area in addition to the area supposed to have the weather conditions changed therein on the basis of the deviation contained in the weather change detection information.

13. The weather information processing system according to claim 10, wherein
the first support arithmetic processing element is configured to generate the weather change area information indicating a weather change level of each mesh forming the area in addition to the area supposed to have the weather conditions changed therein on the basis of the deviation contained in the weather change detection information.

14. The weather information processing system according to claim 10, wherein
the second arithmetic processing element is configured to transmit the weather change detection information to the second weather information processing device, and
the second weather information processing device is provided with a third arithmetic processing element configured to recognize the weather change area information or the second weather information on the basis of communications with the server if the weather change detection information is received from the first weather information processing device.

15. The weather information processing system according to claim 10, wherein
the server is provided with a support map storage unit configured to store a support map information,
the first support arithmetic processing element is configured to recognize a departure or present position and a target position of a user of the second mobile object mounted with the second weather information processing device on the basis of communications with the second weather information processing device, search a support route joining the departure or present position and the target position on the basis of the support map information, and perform a processing to evaluate a relevance ratio between the support route and the weather change area information; and
the second support arithmetic processing element is configured to make the second weather information processing device output the second weather information in accordance with the evaluation result of the relevance ratio on the basis of communications with the second weather information processing device.

16. The weather information processing system according to claim 10, wherein the first arithmetic processing element is configured to generate the weather change detection information by using a previous measurement value of the weather condition variable, or a weather change previous measurement value indicating the previous measurement value at the timing where a deviation between the current measurement value and the previous measurement value is equal to or greater than the predefined value as the reference value.

* * * * *